United States Patent
Cheng

(10) Patent No.: US 11,438,249 B2
(45) Date of Patent: Sep. 6, 2022

(54) CLUSTER MANAGEMENT METHOD, APPARATUS AND SYSTEM

(71) Applicant: Alibaba Group Holding Limited, Grand Cayman (KY)

(72) Inventor: Lin Cheng, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 17/224,874

(22) Filed: Apr. 7, 2021

(65) Prior Publication Data
US 2021/0226871 A1 Jul. 22, 2021

Related U.S. Application Data

(63) Continuation of application No. PCT/CN2019/108367, filed on Sep. 27, 2019.

(30) Foreign Application Priority Data

Oct. 8, 2018 (CN) .......................... 201811168317.0

(51) Int. Cl.
*G06F 15/16* (2006.01)
*H04L 43/0817* (2022.01)
(Continued)

(52) U.S. Cl.
CPC ...... *H04L 43/0817* (2013.01); *H04L 41/0627* (2013.01); *H04L 41/0856* (2013.01);
(Continued)

(58) Field of Classification Search
CPC ............. H04L 43/0817; H04L 43/0823; H04L 41/0863; H04L 41/0627; H04L 41/0856; H04L 41/22
(Continued)

(56) References Cited

U.S. PATENT DOCUMENTS 7,392,421 B1 6/2008 Bloomstein et al.
7,617,289 B2 11/2009 Srinivasan et al.
(Continued)

FOREIGN PATENT DOCUMENTS

CN 103888287 A 6/2014
CN 105119750 A 12/2015
(Continued)

OTHER PUBLICATIONS

International Search Report dated Dec. 27, 2019, from corresponding PCT Application No. PCT/CN2019/108367, 2 pages.
(Continued)

*Primary Examiner* — Karen C Tang
(74) *Attorney, Agent, or Firm* — Lee & Hayes, P.C.

(57) ABSTRACT

A method including acquiring an operation request issued by a distributed consistency system in a cluster, and determining deciding information for processing the operation request and sending the deciding information to an operation and maintenance control platform, wherein the deciding information is determined based on data consistency and availability of the distributed consistency system. The present disclosure solves the technical problems of data loss or service interruption in the distributed consistency system, which are caused by the higher error rate of manual operations used in cluster management methods for distributed consistency systems.

20 Claims, 7 Drawing Sheets

DETERMINE OPERATION TYPE CORRESPONDING TO OPERATION REQUEST
S502

DETERMINE DECIDING INFORMATION FOR EXECUTING OPERATION CORRESPONDING TO OPERATION TYPE, WHEREIN DECIDING INFORMATION IS DETERMINED BASED ON AVAILABILITY CONDITION AND SECURITY CONDITION OF DISTRIBUTED CONSISTENCY SYSTEM
S504

(51) Int. Cl.
*H04L 41/0604* (2022.01)
*H04L 41/0853* (2022.01)
*H04L 41/0859* (2022.01)
*H04L 41/22* (2022.01)
*H04L 43/0823* (2022.01)
*G06F 15/173* (2006.01)

(52) U.S. Cl.
CPC .......... *H04L 41/0863* (2013.01); *H04L 41/22* (2013.01); *H04L 43/0823* (2013.01)

(58) Field of Classification Search
USPC .......................................................... 709/224
See application file for complete search history.

(56) References Cited

U.S. PATENT DOCUMENTS

| | | | |
|---|---|---|---|
| 7,908,448 | B1 | 3/2011 | Chatterjee et al. |
| 8,156,164 | B2 | 4/2012 | Anderson et al. |
| 8,285,689 | B2 | 10/2012 | Du et al. |
| 9,823,973 | B1 | 11/2017 | Natanzon |
| 9,952,767 | B2 | 4/2018 | Zheng et al. |
| 10,235,333 | B1 | 3/2019 | Schuller et al. |
| 10,698,866 | B2 | 6/2020 | Gupta et al. |
| 10,713,275 | B2 | 7/2020 | Merriman et al. |
| 2007/0055853 | A1* | 3/2007 | Hatasaki ............... G06F 9/4401 713/1 |
| 2007/0168571 | A1* | 7/2007 | Ramsey ................... G06F 8/65 710/8 |
| 2013/0262390 | A1* | 10/2013 | Kumarasamy .......... H04L 41/08 707/649 |
| 2014/0149492 | A1* | 5/2014 | Ananthanarayanan ..................... G06F 9/5072 709/203 |
| 2014/0298091 | A1 | 10/2014 | Carlen et al. |
| 2016/0132576 | A1* | 5/2016 | Qi ........................... G06F 16/27 707/600 |
| 2016/0246528 | A1* | 8/2016 | Colgrove ............... G06F 3/0613 |
| 2017/0115978 | A1 | 4/2017 | Modi et al. |
| 2017/0187761 | A1* | 6/2017 | Zhu ..................... G06Q 30/0601 |
| 2017/0206034 | A1* | 7/2017 | Fetik ........................ G06F 21/78 |
| 2017/0288955 | A1* | 10/2017 | Yin ...................... H04L 43/0817 |
| 2017/0346692 | A1* | 11/2017 | Haapanen ............... H04L 63/08 |
| 2018/0157532 | A1* | 6/2018 | Kumar ................... G06F 9/5061 |
| 2020/0089409 | A1* | 3/2020 | Ankireddypalle .... G06F 11/327 |
| 2021/0042266 | A1 | 2/2021 | Shvachko et al. |

FOREIGN PATENT DOCUMENTS

| | | |
|---|---|---|
| CN | 106470219 A | 3/2017 |
| CN | 107729214 A | 2/2018 |
| CN | 108418697 A | 8/2018 |
| CN | 108418697 A | 8/2018 |

OTHER PUBLICATIONS

Written Opinion dated Dec. 27, 2019, from corresponding PCT Application No. PCT/CN2019/108367, 3 pages.
Extended European Search Report dated May 20, 2022 for European Patent Application No. 19871446.1, 9 pages.

* cited by examiner

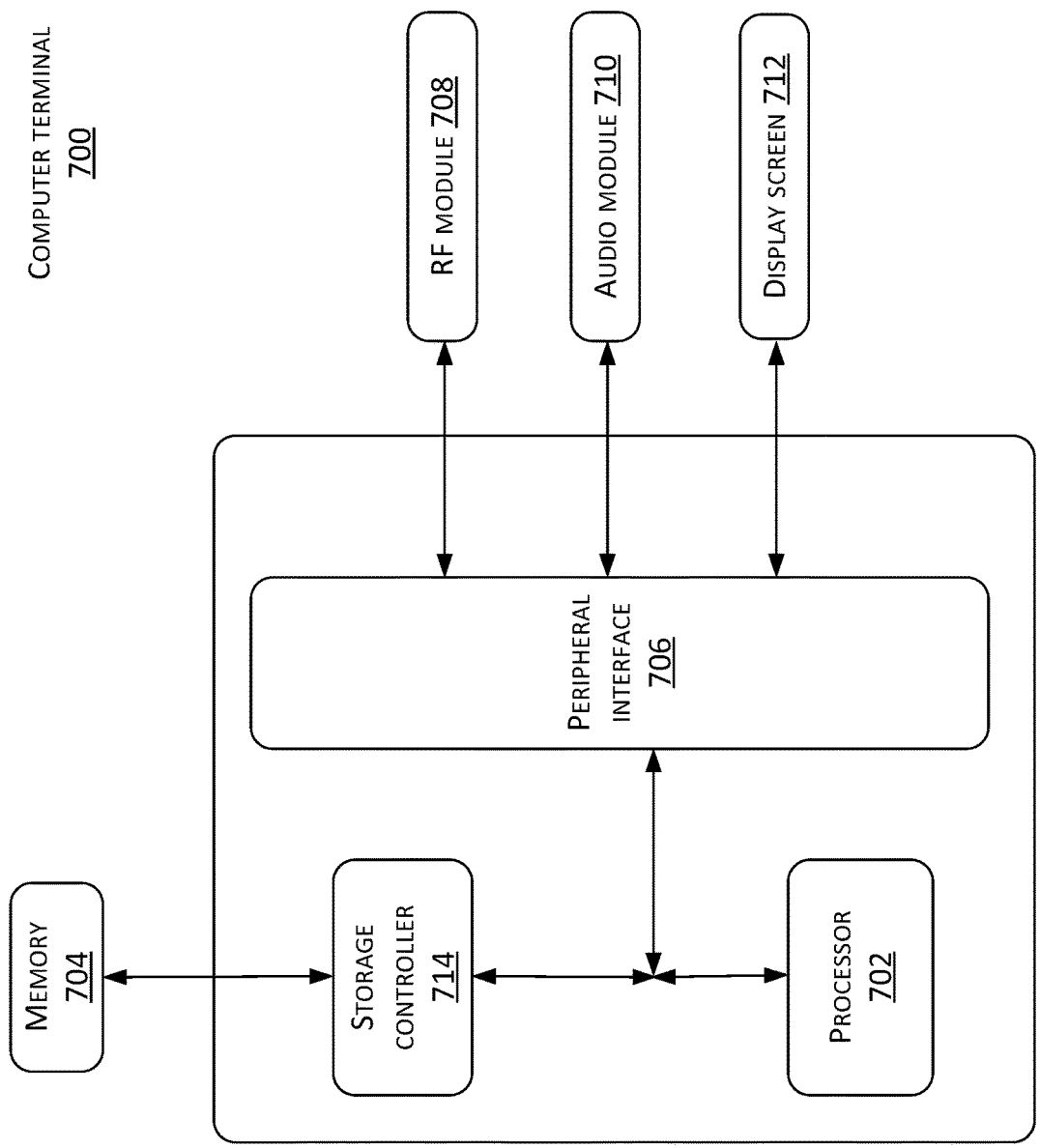

CLUSTER MANAGEMENT METHOD, APPARATUS AND SYSTEM

CROSS REFERENCE TO RELATED APPLICATIONS

This application claims priority to and is a continuation of PCT Patent Application No. PCT/CN2019/108367, filed on 27 Sep. 2019 and entitled "CLUSTER MANAGEMENT METHOD, APPARATUS AND SYSTEM," which claims priority to Chinese patent application No. 201811168317.0 filed on 8 Oct. 2018 and entitled "CLUSTER MANAGEMENT METHOD, APPARATUS AND SYSTEM," which are incorporated by reference herein in their entirety.

TECHNICAL FIELD

The present disclosure relates to the field of computer technology, and, more particularly, to cluster management methods, apparatuses, and systems.

BACKGROUND

In a distributed consistency system, in order to deal with operation and maintenance, such as recurring version releases, configuration changes, and host replacement, a good autonomous operation and maintenance decision system is needed to control the process and ensure normal services of the system and data security. In a large-scale cloud computing scenario, in order to better manage the autonomous operation and maintenance of the distributed consistency system, a unified operation and maintenance scheduling platform is needed to coordinate and interact with the distributed consistency system to achieve autonomous services thereof.

However, at present, the main operation and maintenance method for the distributed consistency system in the industry employs developers of a distributed consistency system for writing various scripts to be used by operating and maintenance personnel for these operation and maintenance activities, which are executed thereby by means of running the corresponding scripts. However, errors tend to occur in the existing implementation manners. Additionally, the operating and maintenance personnel needs to spend tremendous time in familiarizing themselves with the script data to prevent operation errors from happening, which in turn might lead to data loss or service interruption.

With regard to the above-mentioned problems, no effective solution has yet been proposed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Embodiments of the present disclosure provide a cluster management method, apparatus, and system to at least solve the technical problems of data loss or service interruption in a distributed consistency system, which are caused by the higher error rate of manual operations used in cluster management methods for distributed consistency systems.

According to an embodiment of the present disclosure, a cluster management system is provided, comprising: an operation and maintenance control platform, configured to issue an operation request to a distributed consistency system in a cluster and display an operating state of the distributed consistency system; and a decider module, connected with the operation and maintenance control platform and configured to determine deciding information for processing the operation request and send the deciding information to the operation and maintenance control platform, wherein the deciding information is determined based on data consistency and availability of the distributed consistency system.

According to an embodiment of the present disclosure, a cluster management method is further provided, comprising: acquiring an operation request issued by a distributed consistency system in a cluster, and determining deciding information for processing the operation request and sending the deciding information to an operation and maintenance control platform, wherein the deciding information is determined based on data consistency and availability of the distributed consistency system.

According to an embodiment of the present disclosure, a cluster management apparatus is further provided, comprising: an acquisition module, configured to acquire an operation request issued by a distributed consistency system in a cluster; and a processing module, configured to determine deciding information for processing the operation request and send the deciding information to an operation and maintenance control platform, wherein the deciding information is determined based on data consistency and availability of the distributed consistency system.

According to an embodiment of the present disclosure, a storage medium having a program stored therein is further provided, wherein when running, the program controls a device on which the storage medium is located to execute any one of the above-mentioned cluster management methods.

According to an embodiment of the present disclosure, a computer system is further provided, comprising: a processor; and a memory, connected to the processor and configured to provide the processor with instructions for processing the following processing steps: acquiring an operation request issued by a distributed consistency system in a cluster, and determining deciding information for processing the operation request, and sending the deciding information to an operation and maintenance control platform, wherein the deciding information is determined based on data consistency and availability of the distributed consistency system.

In the embodiments of the present disclosure, an operation request issued by a distributed consistency system in a cluster is acquired; and deciding information for processing the operation request is determined and sent to an operation and maintenance control platform, wherein the deciding information is determined based on data consistency and availability of the distributed consistency system. Based on the embodiments of the present disclosure, the objects of ensuring availability of service programs and data security through a decider module in a distributed consistency system are achieved, thereby achieving the technical effects of enhancing the cluster management efficiency of the distributed consistency system and avoiding data loss or service interruption of the distributed consistency system, which in turn solves the technical problems of data loss or service interruption in the distributed consistency system caused by the higher error rate of manual operations used in cluster management methods for distributed consistency systems.

BRIEF DESCRIPTION OF DRAWINGS

The accompanying drawings described herein are intended to provide a further understanding of the present disclosure, and constitute a part of the present disclosure. The illustrative embodiments of the present disclosure and the descriptions thereof are used to explain the present disclosure, and do not constitute an improper limitation to the present disclosure. In the drawings:

FIG. 7 is a structural block diagram of a computer terminal according to an embodiment of the present disclosure.

DESCRIPTION OF EMBODIMENTS

Figure 1:
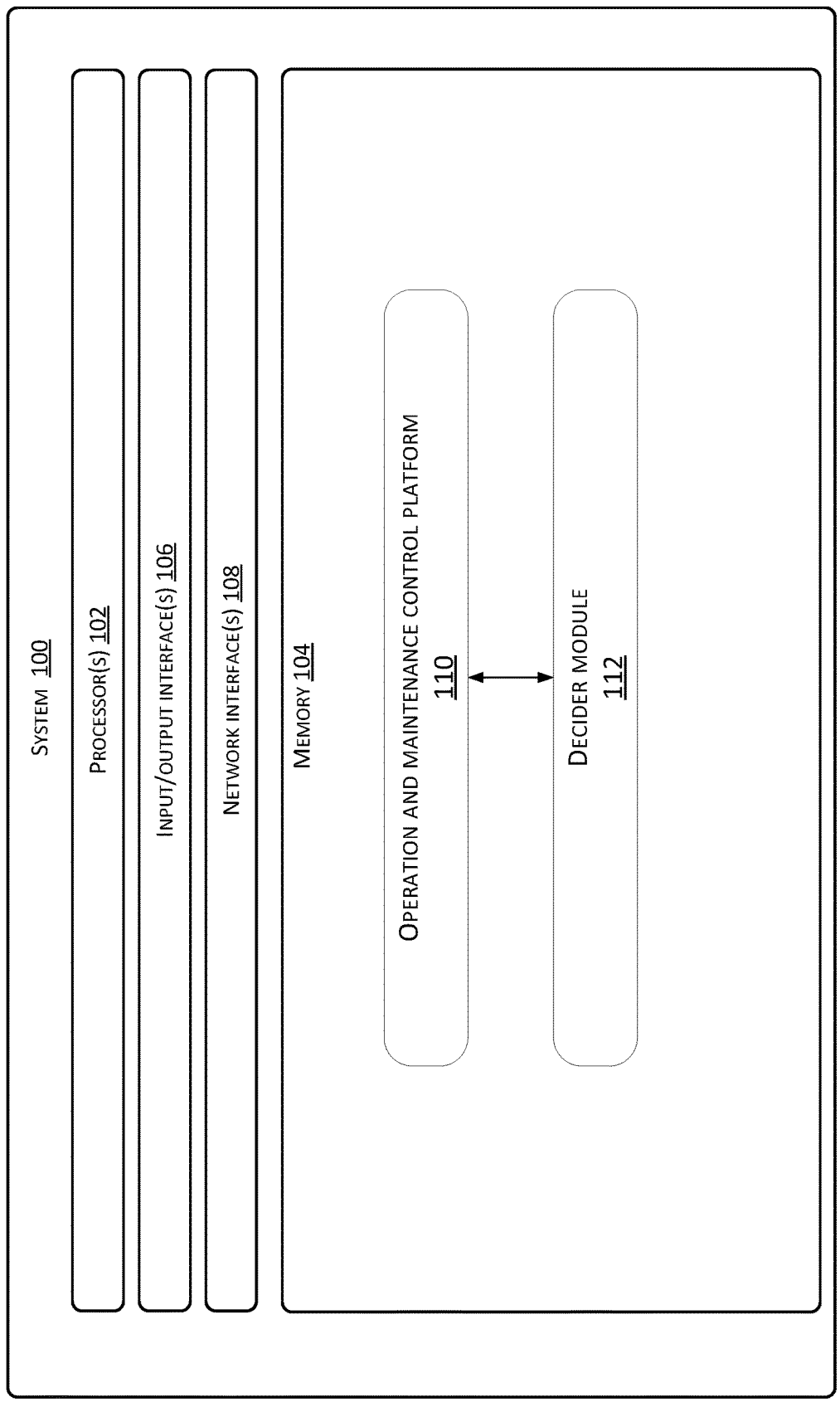
FIG. 1 is a schematic diagram of a cluster management system according to an embodiment of the present disclosure.

In order to enable those skilled in the art to better understand the solutions of the present disclosure, the technical solutions in the embodiments of the present disclosure will be clearly and completely described below with reference to the accompanying drawings in the embodiments of the present disclosure. Obviously, the described embodiments merely represent some, but not all, of the embodiments of the present disclosure. Based on the embodiments of the present disclosure, all other embodiments obtained by one of ordinary skill in the art without creative efforts should fall within the protection scope of the present disclosure.

It should be noted that the terms including "first" and "second" in the description, claims, and above-mentioned accompanying drawings of the present disclosure are used to distinguish similar objects, and are not necessarily used to describe a specific order or sequence. It should be understood that the data used in this way can be interchanged where appropriate, so that the embodiments of the present disclosure described herein may be implemented in an order other than those illustrated or described herein. In addition, the terms "comprising" and "having" and any variations thereof are intended to cover non-exclusive inclusions. For example, a process, method, system, product, or device that contains a series of steps or units is not necessarily limited to the steps or units explicitly listed, and may instead include other steps or units not explicitly listed or inherent to these processes, methods, products, or devices.

First of all, some of the nouns or terms that appear in the description of the embodiments of the present disclosure are explained as follows:

Server collection (Quorum): a server collection of distributed consistency systems; each server collection maintains an in-memory database of a distributed consistency system, as well as the transaction log information and snapshot data stored persistently.

Cluster: the deployment of system services in cloud computing scenarios is classified by cluster; there are a certain number of hosts in a cluster, and systems and products are deployed on the hosts.

HostName: refers to a logical host name, which is unique.

Server role: also referred to as a component module; many component modules are present in a distributed consistency system, and each component module needs to coordinate and process user requests through related protocols.

Monitoring module: used for monitoring the health state of a service role of a distributed consistency system.

Decider module: used for processing a series of operations performed by the operating and maintenance personnel on a distributed consistency system; these operations rely on decisions of the system in that the system confirms whether and when these operations may be performed; the decider module may be a software slave program running on a host or may be a host used for implementing the above-mentioned decision function.

Monitoring platform (MonPF): used for displaying basic monitoring collected from a host and for displaying the monitoring display page of a distributed consistency system.

Operation and maintenance control platform (OMCP): provided for operating and maintenance personnel, who may use the platform for operation and maintenance activities, such as upgrading, host replacement, and the like for a distributed consistent system.

According to embodiments of the present disclosure, an embodiment of a cluster management system as shown in FIG. 1 is provided. FIG. 1 is a schematic diagram of a cluster management system according to an embodiment of the present disclosure. As shown in FIG. 1, a cluster management system 100 includes one or more processor(s) 102 or data processing unit(s) and memory 104. The system 100 may further include one or more input/output interface(s) 106 and one or more network interface(s) 108.

The memory 104 is an example of computer readable media. The computer readable media include non-volatile and volatile media as well as movable and non-movable media, and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media or transitory media such as a modulated data signal and carrier.

The memory 104 may store therein a plurality of modules or units including an operation and maintenance control platform 110 and a decider module 112, wherein:

the operation and maintenance control platform 110 is configured to issue an operation request to a distributed consistency system in a cluster and display an operating state of the distributed consistency system; and the decider module 112, connected with the operation and maintenance control platform 110 and configured to determine deciding information for processing the operation request and send the deciding information to the operation and maintenance control platform 110, wherein the deciding information is determined based on data consistency and availability of the distributed consistency system.

For example, the above-mentioned operation and maintenance control platform (OMCP) is a basic deployment and integration platform for operation and maintenance. The operating and maintenance personnel may issue an operation request to a system in a cluster using said operation and maintenance control platform. Operating states of the above-mentioned distributed consistency system may also be shown to the operating and maintenance personnel using said operation and maintenance control platform, for example, by showing the operating and maintenance personnel a view of the displayed page after the distributed consistency system executes the operation request.

In some embodiments of the present disclosure, the above-mentioned operation request may be used for requesting version upgrade, configuration information upgrade, or server restart of a distributed consistency system.

It should be noted that the above-mentioned operation and maintenance control platform in the embodiment of the present disclosure may also display to the operating and maintenance personnel a monitoring state of the distributed consistency system in the cluster and upgrade states of each stage through a Web page.

In an example embodiment, in a cloud computing scenario, an entire distributed consistency system may be deployed using clusters as a unit for external use, and may be deemed as a management dimension. In order to better achieve service autonomy of the distributed consistency system in the cluster, the attributes of the cluster may be fine-grained and divided into a three-tuple <Cluster, Host-Name, Serverrole> in the embodiment of the present disclosure, so as to better distinguish a cluster from other clusters. After the attributes are divided, a specific API interface may then be designed for operating the distributed consistency system.

It should be noted that the number of hosts present in the cluster represents the number of service roles deployed on each host.

In the above-described example embodiment, the decider module periodically polls the operation and maintenance control platform 110 by using the API interface provided by the operation and maintenance control platform 110. For example, the polling interval may be set by minutes. Furthermore, the operation and maintenance control platform 110 will return to the decider module the operation request for requesting, for example, current operations that need to be approved, operations having been approved, operations in progress, etc.

Furthermore, according to the operation request returned by the operation and maintenance control platform 110, the decider module determines deciding information for processing the operation request based on data consistency and availability of the distributed consistency system, and returns the deciding information to the operation and maintenance control platform 110 through the API interface, such that the operation and maintenance control platform 110 may proceed with corresponding processing according to the deciding information.

In the embodiments of the present disclosure, an operation request issued by a distributed consistency system in a cluster is acquired; and deciding information for processing the operation request is determined and sent to an operation and maintenance control platform, wherein the deciding information is determined based on data consistency and availability of the distributed consistency system.

Based on the embodiments of the present disclosure, the objects of ensuring availability of service programs and data security through a decider module in a distributed consistency system are achieved, thereby achieving the technical effects of enhancing the cluster management efficiency of the distributed consistency system and avoiding data loss or service interruption of the distributed consistency system, which in turn solves the technical problems of data loss or service interruption in the distributed consistency system caused by the higher error rate of manual operations used in cluster management methods for distributed consistency systems.

Figure 2:
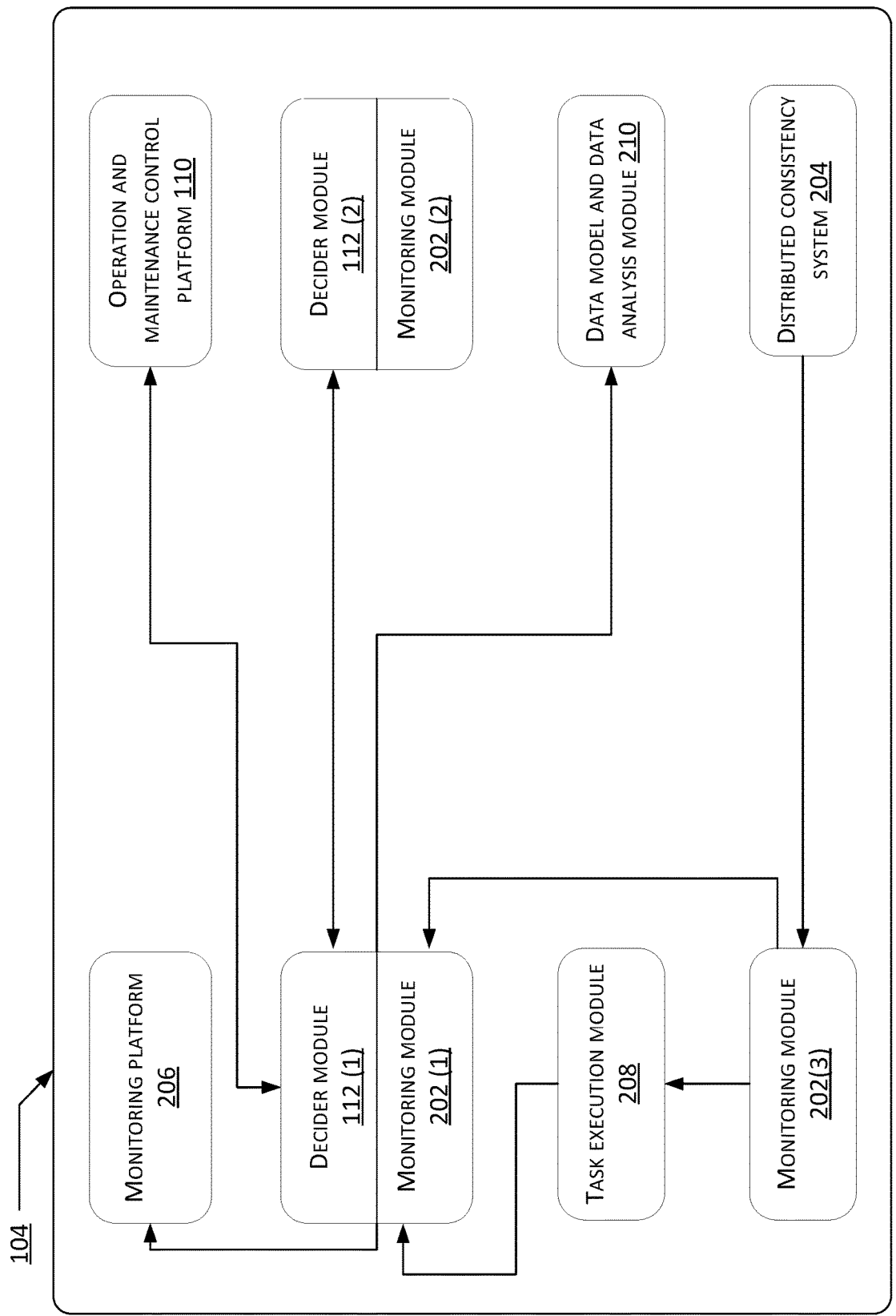
FIG. 2 is a schematic diagram of an example cluster management system according to an embodiment of the present disclosure.

In an example embodiment, as shown in FIG. 2, the system 100 may further comprise the following modules or units stored in the memory 104: one or more decider modules 112(1) and 112(2), and one or more monitoring modules 202(1), 202(2), 202(3), located on a host in the cluster and configured to acquire monitoring data of a component module serving as a service role in the distributed consistency system 204, wherein the service role is a module for coordinating and processing user requests in each host of the cluster; and a monitoring platform 206, configured to collect and display the monitoring data acquired by the monitoring module.

It should be noted that as the distributed consistency system 204 runs in a complex operating environment, it is necessary to monitor not only the basic indicators of the host and the distributed consistency system 204 (such as disk space, disk usage, memory consumption of the host and the system, network bandwidth ratio, etc.), but also service availability of the distributed consistency system 204 (such as, whether the server of the distributed consistency system functions normally, the number of requests per second when the server is in operation, and the like).

In the embodiment of the present disclosure, the distributed consistency system 204 may achieve the above-mentioned monitoring function through the monitoring module 202 provided on the host of the cluster, acquire the monitoring data of the component module serving as the service role in the distributed consistency system 204, and then collect the monitoring data acquired by the monitoring module 202 through the monitoring platform 206 (for example, a MonPE monitoring platform). The monitoring data may be displayed on said monitoring platform 206. The task execution module 208 executes tasks based on the monitoring data from the monitoring modules 202.

In addition, in the embodiment of the present disclosure, the monitoring data of the component module serving as the service role in the distributed consistency system 204 is acquired using the monitoring module 202, and the monitoring data may also be connected to a related data analysis platform including a data model and data analysis module 210, such as an open-source big data analysis and processing system (Spark) for log analysis, thereby facilitating fault diagnosis and automatic workload analysis.

In embodiments of the present disclosure, the monitoring platform 206 is further configured to generate alarm information according to the monitoring data, and send the alarm information to a user-side device.

For example, after the monitoring platform generates alarm information according to the monitoring data, an SMS and telephone platform may be connected and the alarm information may be outputted and prompted to the operating and maintenance personnel or system developers; the monitoring indicator display view of the distributed consistency system over a period of time and the like may further be displayed.

In an example embodiment, the monitoring platform 206 serves as a global monitoring platform, and provides an API interface for reporting the monitoring states for the distributed consistency system 204 in the cluster. The distributed consistency system 204 acquires the monitoring data (for example, various monitoring indicators and health parameters) of the component module serving as the service role in the distributed consistency system 204 by providing a monitoring module 202 (monitoring program), and calls the API interface provided by the monitoring platform 206 to report the monitoring data to the monitoring platform 206. As such, the monitoring platform 206 may learn in real time, from the operating and maintenance personnel or system developers, the current state of the distributed consistency system 204 in the cluster, and respond swiftly to exceptions.

It should be noted that the API interface may be at least one of the following: a first API interface for the operation behavior needing to be initiated by the distributed consistency system, and is initiated by the operating and maintenance personnel for operating the operation and maintenance control platform; and a second API interface, an interface to which the distributed consistency system needs to respond when receiving a decision from the operation and maintenance control platform.

Herein, the first API interface is configured to acquire deciding information of the service role in the cluster; a name of the first API interface is: GetMachineSRActionlnfoForDeciderModule; and a parameter list of the first API interface may be:
> cluster: required
> serverrole: required
A return value of the first API interface may be:
> err_code: standard error code defined by the operation and maintenance control platform.
> err_msg: standard error information defined by the operation and maintenance control platform and corresponding to the error code.

A return result of the first API interface is a JSON (JavaScript Object Notation).

Herein, the second API interface is configured to set the deciding information of the service role in the cluster; a name of the second API interface is: SetMachineSRActionlnfoForDeciderModule; and a parameter list of the second API interface may be:
> cluster: required
> decide_info: required
A return value of the second API interface may be:
> err_code: standard error code defined by the operation and maintenance control platform.
> err_msg: standard error information defined by the operation and maintenance control platform and corresponding to the error code.
> data: a ServerRole list of the host that operates successfully.

A return result of the second API interface is data.

In an example embodiment, the decider module 112 is further configured to determine an operation type corresponding to the operation request, and determine deciding information for executing an operation corresponding to the operation type, wherein the deciding information is determined based on an availability condition and a security condition of the distributed consistency system.

For example, the operation type may be used as a characterization to show on which host an operation is based. Herein, the deciding information includes one of the following: a permission for executing the operation corresponding to the operation type, and a cancellation for executing the operation corresponding to the operation type.

In an example embodiment, the decider module 112 is further configured to determine that an execution of an operation corresponding to the operation request is permitted when the operation type is upgrading configuration information of the distributed consistency system 204.

It should be noted that in the distributed consistency system 204, some configuration information is managed by a global configuration template; therefore, when some configuration information, but not the code, needs to be modified, only the parameters in the global configuration template need to be modified. Then, the configuration information of the distributed consistency system is upgraded as a whole. The distributed consistency system 204 learns changes in the configuration information and acquires new configuration information.

In an example embodiment, if the operating and maintenance personnel initiates an operation request to upgrade configuration information for the distributed consistency system 204 in a certain cluster using the operation and maintenance control platform 110, the distributed consistency system 204 may acquire deciding information corresponding to the operation request. With regard to the scenario in which the configuration information of the distributed consistency system 204 is to be upgraded, a process of the distributed consistency system 204 does not need to be restarted. Since it does not result in unavailable time and does not affect data security in the disk, the API interface provided by the operation and maintenance control platform 110 may then be directly called: SetMachineSRActionlnfoFor; and the decider module 112 may directly respond with the information that permits the execution of the operation corresponding to the operation request, thereby directly approving the operation of upgrading the configuration information.

In an example embodiment, the decider module 112 is further configured to select one host from the cluster for upgrading when the operation type is upgrading services in the distributed consistency system; and before one host is selected from the cluster for upgrading, whether a service of the previous host before said host is upgraded meets the availability condition is determined, and upgrading the selected host when the service meets the availability condition is determined.

When the service in the distributed consistency system 204 is upgraded, the service of the distributed consistency system 204 (i.e., the service program) may be restarted. Further, when the service in the distributed consistency system 204 is upgraded, the unavailable time of the service of the distributed consistency system 204 would be affected temporarily. Therefore, when the decider module 112 obtains the operation request for upgrading a service of the distributed consistency system 204 initiated by the operation and maintenance control platform 110, whether a service of a previous host before said host being upgraded meeting the availability condition needs to be determined. For example, the service availability in the server collection Quorum of the distributed consistency system and an upgrade sequence in which only a service in one host is upgraded at a time in the server collection Quorum is adopted. Further, each time when a service of a host is selected for upgrading, it needs to be ensured that a service of the previous host before said selected host being upgraded meets the availability condition; and when the service meets the availability condition, it is determined to upgrade the selected host.

In an example embodiment, the decider module 112 is further configured to acquire a serial number of a newly added host when the operation type is replacing a host deployed by the distributed consistency system, and establish an association between the serial number of the newly added host and serial numbers of hosts not having been replaced in the distributed consistency system to form a new distributed consistency system.

Servers used in a cloud computing scenario are all common servers. Therefore, a large number of hosts are out of warranty or damaged each year. It is necessary to replace the hosts and re-deploy the service program of the distributed consistency system on new hosts.

In the above-described example embodiment, when a host in the server collection Quorum crashes, the number of service programs of the available distributed consistency system in the server collection Quorum will decrease by one. Therefore, the service program needs to be deployed on a new host.

Assuming that there are three hosts in a server collection, and the service program of the distributed consistency system is deployed on each host; each of the three hosts has a fixed serial number, which may be, for example, 1, 2, and 3, with respect to the distributed consistency system. When the host with the serial number 3 crashes and needs to be replaced, a newly added host with a serial number 4 and the previous hosts with the serial numbers 1 and 2 may still be determined to form a server collection in the distributed consistency system by modifying the protocol of the distributed consistency system.

It should be noted that since the previous hosts with the serial numbers 1 and 2 are not aware of the newly added host with the serial number 4, the newly added host with the serial number 4 cannot directly form a server collection with the previous hosts having the serial numbers 1 and 2. Thus, it needs to be ensured that when a host is replaced, the service program can autonomously combine 1, 2, and 4 to form a new server collection, thereby truly implementing an autonomous host replacement service.

In an example embodiment, the decider module is further configured to stop external services of the distributed consistency system when the operation type is replacing a disk used by a designated host in the distributed consistency system, acquire log information and snapshot data from other hosts in the distributed consistency system, and resume the external services after storing the log information and the snapshot data to a newly added disk.

In the embodiment of the present disclosure, the distributed consistency system may request log information and snapshot data persistently and transactionally. Therefore, read and write operations on the host disk need to be involved. Further, as the host disk has a high fault rate, IO fault occurs frequently in the distributed consistency system program, which indicates that the disk is damaged or is out of warranty.

Therefore, after an alarm is sent for a faulty disk monitored by the monitoring module, the operating and maintenance personnel needs to initiate a request to replace the host disk using the operation and maintenance control platform and sends the request to the decider module of the distributed consistency system. After receiving the request to replace the host disk sent from the operation and maintenance control platform, the decider module would need to deal with issues related to data security. For example, if a disk location of the logs and snapshots of the distributed consistency system is /dfs/disk1, service degradation is performed for a service program of the distributed consistency system when IO fault occurs on the first disk disk1, external services of the distributed consistency system are stopped, and the data are restored in a disk location /dfs/disk2 of a newly added second disk. All log information and snapshot data are acquired from other hosts in the server collection, and the external services are resumed after the data is restored.

According to the embodiments of the present disclosure, an embodiment of a cluster management method is further provided. It should be noted that the steps shown in the flowchart in the accompanying drawing may be executed, for example, as a set of computer-executable instructions in a computer system. Although a logical sequence is shown in the flowchart, in some cases, the steps shown or described herein may be executed in a different sequence.

Figure 3:
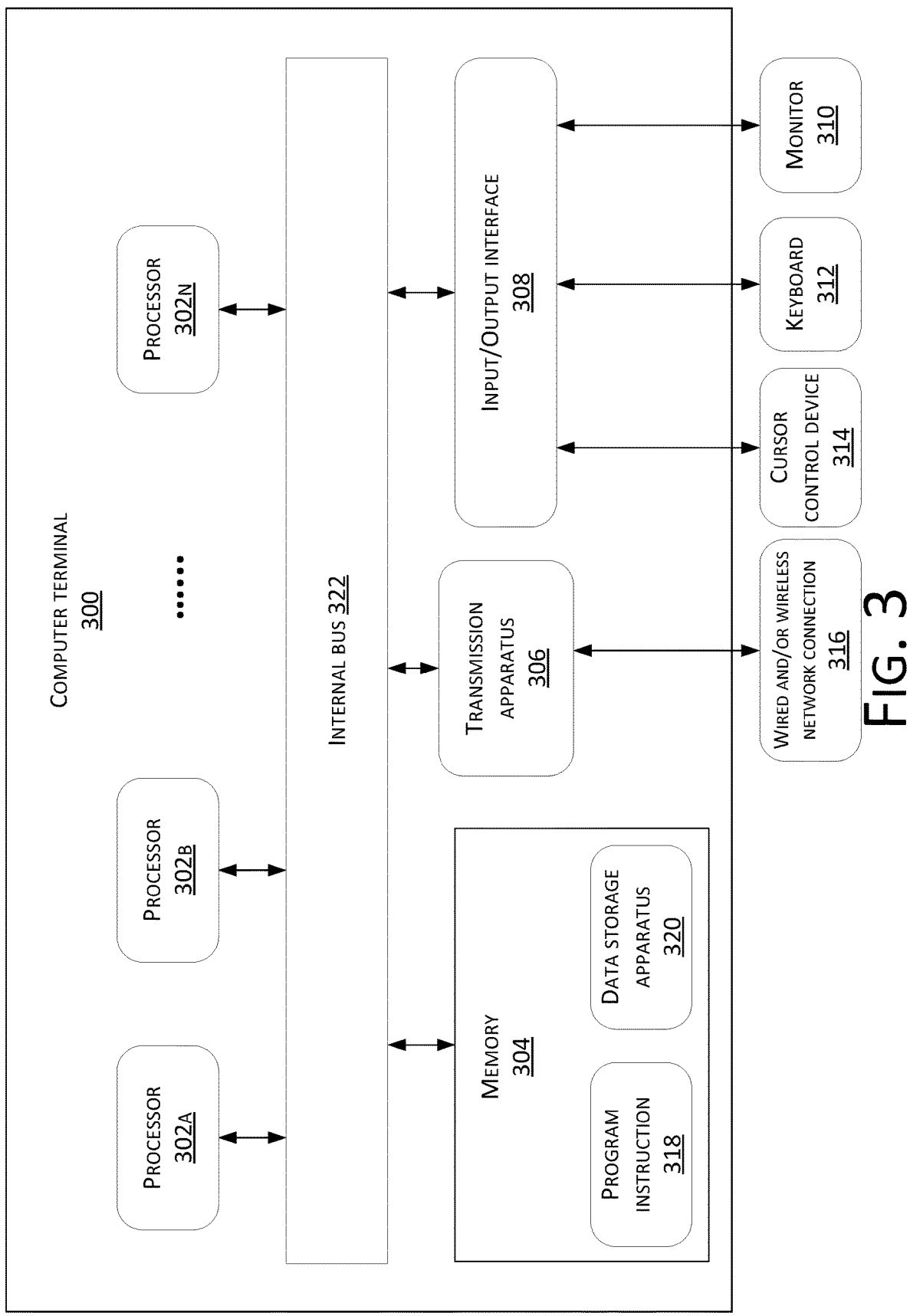
FIG. 3 is a block diagram of a hardware structure of a computer terminal (or mobile device) for implementing a cluster management method according to an embodiment of the present disclosure.

The method embodiment provided in the embodiment of the present disclosure may be executed in a mobile terminal, a computer terminal, or similar computing apparatus. FIG. 3 shows a block diagram of a hardware structure of a computer terminal (or mobile device) for implementing the cluster management method. As shown in FIG. 3, a computer terminal 300 (such as a mobile device) may comprise one or more (shown in the figure as 302a, 302b, . . . , 302n) processors 302 (the processor 302 may include, but not limited to, processing apparatuses such as a microprocessor including MCUs or a programmable logic device including FPGAs), a memory 304 for storing data, and a transmission apparatus 306 for communications. In addition, the computer terminal 300 may further include an input/out interface 308 which is connected with a display such as a monitor 310, a keyboard 312, a curse control device 314. The input/out interface 308 may further include a universal serial bus (USB) port (can be included as one of the ports of the I/O interface), a network interface, a power supply, and/or a camera (not shown in FIG. 3). The transmission apparatus 306 is used for wired and/or wireless network communication 316. The program instructions 318 stored in the memory 104 are executable by the processor 302 to form the data storage apparatus 320. All components of the computer terminal 300 are connected via an internal bus 322.

Those of ordinary skill in the art may understand that the structure shown in FIG. 3 is only illustrative, and does not limit the structure of the above-mentioned electronic apparatus. For example, the computer terminal 300 may also include more or fewer components than those shown in FIG. 3, or have a configuration different from that shown in FIG. 3.

It should be noted that the above-mentioned one or more processors 302 and/or other data processing circuits may be generally referred to herein as a "data processing circuit." The data processing circuit may be embodied as a whole or in part as software, hardware, firmware, or any other combinations. In addition, the data processing circuit may be a stand-alone processing module, or may be fully or partially integrated into any one of the other elements within the computer terminal 300 (or mobile device). As involved in the embodiment of the present disclosure, the data processing circuit may serve as a processor control (for example, a selection of a variable resistor terminal path connected to an interface).

The memory 304 may be configured to store software programs and modules of application software, such as program instructions/data storage apparatuses corresponding to cluster management in the embodiment of the present disclosure. The processor 302 runs the software programs and modules stored in the memory 304 to execute various function applications and data processing, i.e., implementing the above-mentioned cluster management method. The memory 104 may include a high-speed random-access memory, and may also include a non-volatile memory, such as one or more magnetic storage apparatuses, flash memories, or other non-volatile solid-state memories. In some examples, the memory 304 may further include memories remotely disposed with respect to the processor 302, and these remote memories may be connected to the computer terminal 300 via a network. Examples of the above-mentioned network include, but not limited to, the Internet, corporate intranets, local area networks, mobile communication networks, and combinations thereof.

The transmission apparatus 306 is configured to receive or send data via a network. Specific examples for the above-mentioned network may include a wireless network provided by the communication provider of the computer terminal 300. In one example, the transmission apparatus 306 includes a network adapter (Network Interface Controller, NIC), which may be connected to other network devices through a base station, such that communication with the Internet is made possible. In one example, the transmission apparatus 106 may be a radio frequency (RF) module, which is used to communicate with the Internet in a wireless manner.

The display may be, for example, a touch screen liquid crystal display (LCD), which enables a user to interact with a user interface of the computer terminal 300 (such as mobile device).

Figure 4:
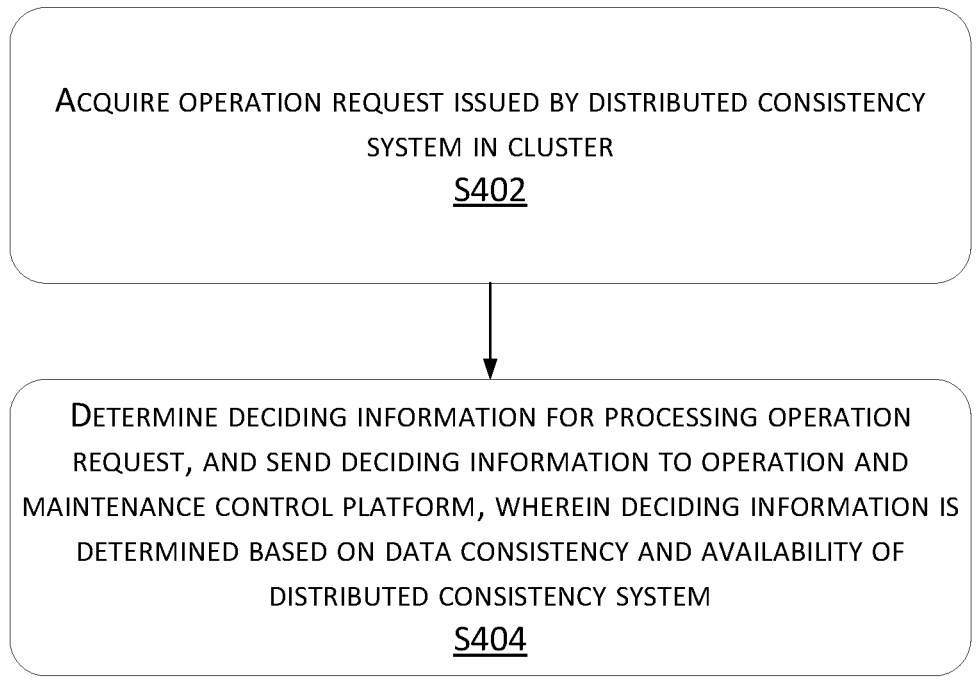
FIG. 4 is a flowchart of a cluster management method according to an embodiment of the present disclosure.

Under the above-mentioned operating environment, the present disclosure provides a cluster management method as shown in FIG. 4. FIG. 4 is a flowchart of a cluster management method according to an embodiment of the application. As shown in FIG. 4, the method comprises the following steps:

Step S402. Acquire an operation request issued by a distributed consistency system in a cluster;

Step S404. Determine deciding information for processing the operation request, and send the deciding information to an operation and maintenance control platform, wherein the deciding information is determined based on data consistency and availability of the distributed consistency system.

For example, the above-mentioned operation and maintenance control platform (OMCP) is a basic deployment and integration platform for operation and maintenance. The operating and maintenance personnel may issue an operation request to a system in a cluster using said operation and maintenance control platform. Operating states of the above-mentioned distributed consistency system may also be shown to the operating and maintenance personnel using said operation and maintenance control platform, for example, by showing the operating and maintenance personnel a view of the displayed page after the distributed consistency system executes the operation request.

In an example embodiment, the above-mentioned operation request may be used for requesting version upgrade, configuration information upgrade, or server restart of a distributed consistency system.

It should be noted that the above-mentioned operation and maintenance control platform in the embodiment of the present disclosure may also display to the operating and maintenance personnel a monitoring state of the distributed consistency system in the cluster and upgrade states of each stage through a Web page.

In an example embodiment, in a cloud computing scenario, an entire distributed consistency system may be deployed using clusters as a unit for external use, and may be deemed as a management dimension. In order to better achieve service autonomy of the distributed consistency system in the cluster, the attributes of the cluster may be fine-grained and divided into a three-tuple <Cluster, HostName, Serverrole> in the embodiment of the present disclosure, so as to better distinguish a cluster from other clusters. After the attributes are divided, a specific API interface may then be designed for operating the distributed consistency system. Moreover, the number of hosts disposed in the cluster and the number of service roles deployed on each host may further be determined.

In the above-described example embodiment, the decider module periodically polls the operation and maintenance control platform by using the API interface provided by the operation and maintenance control platform. For example, the polling interval may be set by minutes. Furthermore, the operation and maintenance control platform will return to the decider module the operation request for requesting, for example, current operations that need to be approved, operations having been approved, operations in progress, etc.

Furthermore, according to the operation request returned by the operation and maintenance control platform, the decider module determines deciding information for processing the operation request based on data consistency and availability of the distributed consistency system, and returns the deciding information to the operation and maintenance control platform through the API interface, such that the operation and maintenance control platform may proceed with corresponding processing according to the deciding information.

In the embodiments of the present disclosure, an operation request issued by a distributed consistency system in a cluster is acquired; and deciding information for processing the operation request is determined and sent to an operation and maintenance control platform, wherein the deciding information is determined based on data consistency and availability of the distributed consistency system.

Based on the embodiments of the present disclosure, the objects of ensuring availability of service programs and data security through a decider module in a distributed consistency system are achieved, thereby achieving the technical effects of enhancing the cluster management efficiency of the distributed consistency system and avoiding data loss or service interruption of the distributed consistency system, which in turn solves the technical problems of data loss or service interruption in the distributed consistency system caused by the higher error rate of manual operations used in cluster management methods for distributed consistency systems.

Figure 5:
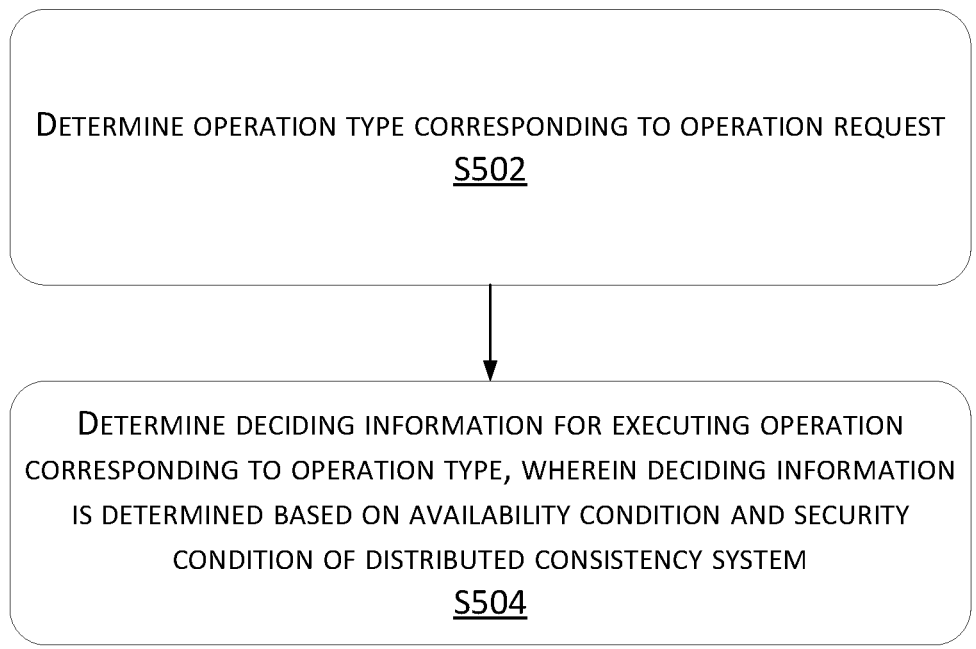
FIG. 5 is a flowchart of an example cluster management method according to an embodiment of the present disclosure.

In an example embodiment, a flowchart of an example cluster management method according to an embodiment of the present disclosure is shown in FIG. 5. As shown in FIG. 5, determining deciding information for processing the operation request comprises the following steps:

Step S502. Determine an operation type corresponding to the operation request;

Step S504. Determine deciding information for executing an operation corresponding to the operation type, wherein the deciding information is determined based on an availability condition and a security condition of the distributed consistency system.

For example, the operation type may be used as a characterization to show on which host an operation is based. Herein, the deciding information includes one of the following: a permission for executing the operation corresponding to the operation type, and a cancellation for executing the operation corresponding to the operation type.

As an example, embodiment, the step of determining deciding information for executing the operation corresponding to the operation type comprises: determining that an execution of an operation corresponding to the operation request is permitted when the operation type is upgrading configuration information of the distributed consistency system.

It should be noted that in the distributed consistency system, some configuration information is managed by a global configuration template; therefore, when some configuration information, but not the code, needs to be modified, only the parameters in the global configuration template need to be modified. Then, the configuration information of the distributed consistency system is upgraded as a whole. The distributed consistency system learns changes in the configuration information and acquires new configuration information.

In an example embodiment, if the operating and maintenance personnel initiates an operation request to upgrade configuration information for a distributed consistency system in a certain cluster using the operation and maintenance control platform, the distributed consistency system may acquire deciding information corresponding to the operation request. With regard to the scenario in which the configuration information of the distributed consistency system is to be upgraded, a process of the distributed consistency system does not need to be restarted. Since it does not result in unavailable time and does not affect data security in the disk, the API interface provided by the operation and maintenance control platform may then be directly called: SetMachineSRActionlnfoFor; and the decider module may directly respond with the information that permits the execution of the operation corresponding to the operation request, thereby directly approving the operation of upgrading the configuration information.

In another example embodiment, the step of determining deciding information for executing the operation corresponding to the operation type comprises: selecting one host from the cluster for upgrading when the operation type is upgrading services in the distributed consistency system; and before selecting one host from the cluster for upgrading, determining whether a service of the previous host before said host is upgraded meets the availability condition; and determining to upgrade the selected host when the service meets the availability condition.

When the service in the distributed consistency system is upgraded, the service of the distributed consistency system (i.e., the service program) may be restarted. Further, when the service in the distributed consistency system is upgraded, the unavailable time of the service of the distributed consistency system would be affected temporarily. Therefore, when the decider module obtains the operation request for upgrading a service of the distributed consistency system initiated by the operation and maintenance control platform, whether a service of a previous host before said host being upgraded meeting the availability condition needs to be determined, for example, the service availability in the server collection Quorum of the distributed consistency system and an upgrade sequence in which only a service in one host is upgraded at a time in the server collection is adopted. Further, each time when a service of a host is selected for upgrading, a service of the previous host before said selected host being upgraded meeting the availability condition needs to be ensured; and when the service meets the availability condition, it is determined to upgrade the selected host.

In the embodiment of the present disclosure, for example, the step of determining deciding information for executing the operation corresponding to the operation type comprises: acquiring a serial number of a newly added host when the operation type is replacing a host deployed by the distributed consistency system, and establishing an association between the serial number of the newly added host and serial numbers of hosts not having been replaced in the distributed consistency system to form a new distributed consistency system.

Servers used in a cloud computing scenario are all common servers. Therefore, a large number of hosts are out of warranty or damaged each year. It is necessary to replace the hosts and re-deploy the service program of the distributed consistency system on new hosts.

In the above-described example embodiment, when a host in the server collection crashes, the number of service programs of the available distributed consistency system in the server collection will decrease by one. Therefore, the service program needs to be deployed on a new host.

Assuming that there are three hosts in a server collection, and the service program of the distributed consistency system is deployed on each host; each of the three hosts has a fixed serial number, which may be, for example, 1, 2, and 3, with respect to the distributed consistency system. When the host with the serial number 3 crashes and needs to be replaced, a newly added host with a serial number 4 and the previous hosts with the serial numbers 1 and 2 may still be determined to form a server collection in the distributed consistency system by modifying the protocol of the distributed consistency system.

It should be noted that since the previous hosts with the serial numbers 1 and 2 are not aware of the newly added host with the serial number 4, the newly added host with the serial number 4 cannot directly form a server collection with the previous hosts having the serial numbers 1 and 2. Thus, it needs to be ensured that when a host is replaced, the service program can autonomously combine 1, 2, and 4 to form a new server collection, thereby truly implementing an autonomous host replacement service.

An example embodiment is further present in the embodiment of the present disclosure in which the step of determining the deciding information for executing the operation corresponding to the operation type comprises: stopping external services of the distributed consistency system when the operation type is replacing a disk used by a designated host in the distributed consistency system, acquiring log information and snapshot data from other hosts in the distributed consistency system, and resuming the external services after the log information and the snapshot data are stored to a newly added disk.

In the embodiment of the present disclosure, the distributed consistency system may request log information and snapshot data persistently and transactionally. Therefore, read and write operations on the host disk need to be involved. Further, as the host disk has a high fault rate, IO fault occurs frequently in the distributed consistency system program, which indicates that the disk is damaged or is out of warranty.

Therefore, after an alarm is sent for a faulty disk monitored by the monitoring module, the operating and maintenance personnel needs to initiate a request to replace the host disk using the operation and maintenance control platform and sends the request to the decider module of the distributed consistency system. After receiving the request to replace the host disk sent from the operation and maintenance control platform, the decider module would need to deal with issues related to data security. For example, if a disk location of the logs and snapshots of the distributed consistency system is /dfs/disk1, service degradation is performed for a service program of the distributed consistency system when IO fault occurs on the first disk disk1, external services of the distributed consistency system are stopped, and the data are restored in a disk location /dfs/disk2 of a newly added second disk. All log information and snapshot data are acquired from other hosts in the server collection, and the external services are resumed after the data is restored.

It should be noted that for example implementations of the embodiment, reference may be made to the related description. Details are not elaborated herein again.

It should be noted that with regard to the above-described method embodiments, in order to provide a concise description, the method embodiments are all expressed as a series of action combinations. Those skilled in the art, however, should know that the present disclosure is not limited by the described sequence of actions as some steps may be executed in another sequence or simultaneously according to the present disclosure. Secondly, those skilled in the art should also know that the embodiments described in the description are all example embodiments, and the involved actions and modules are not necessarily required by the present disclosure.

Based on the description of the foregoing embodiments, those skilled in the art can clearly understand that the methods of the foregoing embodiments can be implemented using software and a needed universal hardware platform, and can certainly be implemented also by using hardware; in many cases, the former is a better implementation, however. Based on such an understanding, the part of the technical solution of the present invention, which is in in essential or contributes to the conventional techniques, can be embodied in the form of a software product. The computer software product is stored in a storage medium (such as a ROM/RAM, a magnetic disk, and an optical disk) and includes several instructions for enabling a terminal device (which may be a mobile phone, a computer, a server, a network device, or the like) to execute the method of each embodiment of the present invention.

According to the embodiments of the present disclosure, an embodiment of a computer system is further provided, comprising: a processor and a memory, connected to the processor and configured to provide the processor with instructions for processing the following processing steps: acquiring an operation request issued by a distributed consistency system in a cluster, and determining deciding information for processing the operation request and sending the deciding information to an operation and maintenance control platform, wherein the deciding information is determined based on data consistency and availability of the distributed consistency system.

In the embodiment of the present disclosure, an operation request issued by a distributed consistency system in a cluster is acquired; and deciding information for processing the operation request is determined and sent to an operation and maintenance control platform, wherein the deciding information is determined based on data consistency and availability of the distributed consistency system.

Based on the embodiments of the present disclosure, the objects of ensuring availability of service programs and data security through a decider module in a distributed consistency system are achieved, thereby achieving the technical effects of enhancing the cluster management efficiency of the distributed consistency system and avoiding data loss or service interruption of the distributed consistency system, which in turn solves the technical problems of data loss or service interruption in the distributed consistency system caused by the higher error rate of manual operations used in cluster management methods for distributed consistency systems.

It should be noted that for example implementations of the embodiment, reference may be made to the related description in Embodiments 1 and 2. Details are not elaborated herein again.

Figure 6:
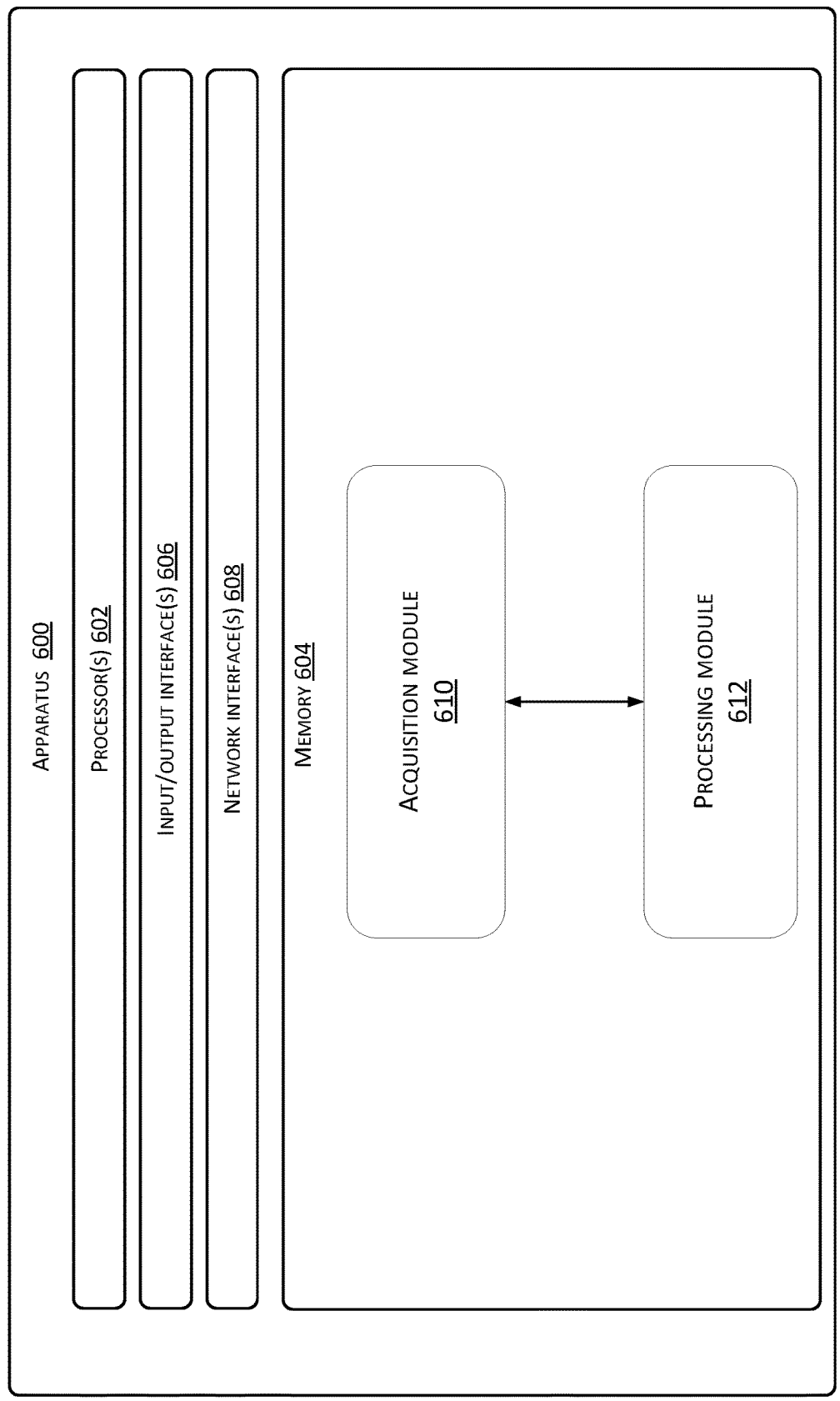
FIG. 6 is a schematic diagram of a cluster management apparatus according to an embodiment of the present disclosure.

According to the embodiments of the present disclosure, an embodiment of an apparatus for implementing the above-described cluster management method is further provided. FIG. 6 is a schematic diagram of a cluster management apparatus according to an embodiment of the present disclosure. As shown in FIG. 6, an apparatus 600 includes one or more processor(s) 602 or data processing unit(s) and memory 604. The apparatus 600 may further include one or more input/output interface(s) 606 and one or more network interface(s) 608.

The memory 604 is an example of computer readable media. The memory 604 may store therein a plurality of modules or units including an acquisition module 610 and a processing module 612, wherein:

the acquisition module 610 is configured to acquire an operation request issued by a distributed consistency system in a cluster; and the processing module 612 is configured to determine deciding information for processing the operation request and send the deciding information to an operation and maintenance control platform, wherein the deciding information is determined based on data consistency and availability of the distributed consistency system.

It should be noted here that the acquisition module 610 and the processing module 612 correspond to the steps S402 to S404. The two modules and the corresponding steps implement the same examples and are used in the same applied scenarios, but the two modules should not be limited to the content disclosed above. It should be noted that as a part of the apparatus, the above-mentioned modules may run in the computer terminal 300 provided in the above method embodiments.

It should be noted that for example implementations of the embodiment, reference may be made to the related description in the above embodiments. Details are not elaborated herein again.

According to the embodiment of the present disclosure, an embodiment of a computer terminal is further provided. The computer terminal may be any computer terminal device in a computer terminal group. For example, in this embodiment, the computer terminal may also be replaced with a terminal device such as a mobile terminal.

For example, in this embodiment, the computer terminal may be located in at least one of the multiple network devices in a computer network.

In this embodiment, the computer terminal may execute program codes of the following steps in a cluster management method: acquiring an operation request issued by a distributed consistency system in a cluster, and determining deciding information for processing the operation request and sending the deciding information to an operation and maintenance control platform, wherein the deciding information is determined based on data consistency and availability of the distributed consistency system.

For example, FIG. 7 is a structural block diagram of a computer terminal according to an embodiment of the present disclosure. As shown in FIG. 7, a computer terminal 700 may comprise: one or more (only one is shown in the figure) processors 702, a memory 704, and a peripheral interface 706 that may communicate with a RF module 708, an audio module 710, and a display screen 712. The processor 702 and the memory 704 are communicated via a storage controller 714.

The memory 704 may be configured to store software programs and modules, such as program instructions/modules corresponding to the cluster management method and apparatus in the embodiments of the present disclosure. The processor 702 runs the software programs and modules stored in the memory to execute various function applications and data processing, i.e., implementing the above-mentioned cluster management method. The memory may include a high-speed random-access memory, and may also include a non-volatile memory, such as one or more magnetic storage apparatuses, flash memories, or other non-volatile solid-state memories. In some examples, the memory may further include memories remotely disposed with respect to the processor, and these remote memories may be connected to the computer terminal 700 via a network. Examples of the above-mentioned network include, but not limited to, the Internet, corporate intranets, local area networks, mobile communication networks, and combinations thereof.

The processor 702 may call information and application programs stored in the memory through the transmission apparatus to execute the following steps: acquiring an operation request issued by a distributed consistency system in a cluster, and determining deciding information for processing the operation request and sending the deciding information to an operation and maintenance control platform, wherein the deciding information is determined based on data consistency and availability of the distributed consistency system.

For example, the processor 702 may further execute program codes of the following steps: determining an operation type corresponding to the operation request, and determining deciding information for executing an operation corresponding to the operation type, wherein the deciding information is determined based on an availability condition and a security condition of the distributed consistency system.

For example, the processor 702 may further execute a program code of the following step: determining that an execution of an operation corresponding to the operation request is permitted when the operation type is upgrading configuration information of the distributed consistency system.

For example, the processor 702 may further execute program codes of the following steps: selecting one host from the cluster for upgrading when the operation type is upgrading services in the distributed consistency system, and before selecting one host from the cluster for upgrading, determining whether a service of the previous host before said host is upgraded meets the availability condition, and determining to upgrade the selected host when the service meets the availability condition.

For example, the processor 702 may further execute program codes of the following steps: acquiring a serial number of a newly added host when the operation type is replacing a host deployed by the distributed consistency system, and establishing an association between the serial number of the newly added host and serial numbers of hosts not having been replaced in the distributed consistency system to form a new distributed consistency system.

For example, the processor 702 may further execute program codes of the following steps: stopping external services of the distributed consistency system when the operation type is replacing a disk used by a designated host in the distributed consistency system, acquiring log information and snapshot data from other hosts in the distributed consistency system, and resuming the external services after the log information and the snapshot data are stored to a newly added disk.

A cluster management solution is provided when the embodiment of the present disclosure is used. The cluster management solution comprises acquiring an operation request issued by a distributed consistency system in a cluster, and determining deciding information for processing the operation request and sending the deciding information to an operation and maintenance control platform, wherein the deciding information is determined based on data consistency and availability of the distributed consistency system.

Based on the embodiments of the present disclosure, the objects of ensuring availability of service programs and data security through a decider module in a distributed consistency system are achieved, thereby achieving the technical effects of enhancing the cluster management efficiency of the distributed consistency system and avoiding data loss or service interruption of the distributed consistency system, which in turn solves the technical problems of data loss or service interruption in the distributed consistency system caused by the higher error rate of manual operations used in cluster management methods for distributed consistency systems.

A person of ordinary skill in the art can understand that the structure shown in FIG. 7 is exemplary; and the computer terminal may also be a smart phone (such as an Android phone and an iOS phone), a tablet computer, a palm computer, and a Mobile Internet Device (MID), a PAD, and other terminal devices. FIG. 7 does not limit the structure of the above electronic device. For example, the computer terminal 700 may also include more or fewer components (such as a network interface, a display apparatus, etc.) than those shown in FIG. 7, or have a configuration different from that shown in FIG. 7.

Those of ordinary skill in the art can understand that all or part of the steps in the various methods of the above-mentioned embodiments can be completed by instructing the relevant hardware of the terminal device through a program. The program can be stored in a computer-readable storage medium, which may include: a flash disk, a read-only memory (ROM), a random-access memory (RAM), a magnetic disk, an optical disk, or the like.

According to the embodiment of the present disclosure, an embodiment of a storage medium is further provided. For example, in this embodiment, the storage medium may be configured to store program codes executed by the cluster management method provided in above-described method embodiment.

For example, in this embodiment, the storage medium may be located in any computer terminal of a computer terminal group in a computer network, or located in any mobile terminal of a mobile terminal group.

For example, in this embodiment, the storage medium is configured to store program codes for executing the following steps: acquiring an operation request issued by a distributed consistency system in a cluster, and determining deciding information for processing the operation request and sending the deciding information to an operation and maintenance control platform, wherein the deciding information is determined based on data consistency and availability of the distributed consistency system.

For example, in this embodiment, the storage medium is configured to store program codes for executing the following steps: determining an operation type corresponding to the operation request, and determining deciding information for executing an operation corresponding to the operation type, wherein the deciding information is determined based on an availability condition and a security condition of the distributed consistency system.

For example, in this embodiment, the storage medium is configured to store a program code for executing the following step: determining that an execution of an operation corresponding to the operation request is permitted when the operation type is upgrading configuration information of the distributed consistency system.

For example, in this embodiment, the storage medium is configured to store program codes for executing the following steps: selecting one host from the cluster for upgrading when the operation type is upgrading services in the distributed consistency system, and before selecting one host from the cluster for upgrading, determining whether a service of the previous host before said host is upgraded meets the availability condition, and determining to upgrade the selected host when the service meets the availability condition.

For example, in this embodiment, the storage medium is configured to store program codes for executing the following steps: acquiring a serial number of a newly added host when the operation type is replacing a host deployed by the distributed consistency system, and establishing an association between the serial number of the newly added host and serial numbers of hosts not having been replaced in the distributed consistency system to form a new distributed consistency system.

For example, in this embodiment, the storage medium is configured to store program codes for executing the following steps: stopping external services of the distributed consistency system when the operation type is replacing a disk used by a designated host in the distributed consistency system, acquiring log information and snapshot data from other hosts in the distributed consistency system, and resuming the external services after the log information and the snapshot data are stored to a newly added disk.

The serial numbers of the embodiments of the present disclosure are merely for description, and do not represent the quality of the embodiments.

In the above-described embodiments of the present disclosure, the description of each embodiment has its own emphasis. For any part that is not described in detail in one embodiment, reference may be made to related descriptions in other embodiments.

In the several embodiments provided by the present disclosure, it should be appreciated that the disclosed technical content may be implemented in other manners. The apparatus embodiments described above are only for illustration. For example, the division of the units is merely a logical function division. In actual implementation, there may be other division means. For example, multiple units or components may be combined or may be integrated into another system, or some features may be disregarded or left unimplemented. In addition, the displayed or discussed mutual coupling, direct coupling, or communication connection may be achieved through some interfaces; indirect coupling or communication connection of units or modules may be in electrical or other forms.

The units described as separate components may or may not be physically separated. The components displayed as units may or may not be physical units; that is, they may be located in one place, or may be distributed on multiple network units. Some or all of the units may be selected according to actual needs to achieve the objects of the solutions of the embodiments.

In addition, various function units in each embodiment of the present disclosure may be integrated into one processing unit, or each unit may be individually and physically present, or two or more units may be integrated into one unit. The above-mentioned integrated units may be implemented in the form of hardware or may be implemented as software function units.

If the integrated units are implemented in the form of software function units and sold or used as independent products, they may be stored in a computer-readable storage medium. Based on such an understanding, the part of the technical solution of the present invention or all or part of the technical solution, which is in essential or contributes to the conventional techniques, can be embodied in the form of a software product. The computer software product is stored in a storage medium and includes several instructions for enabling a computer device (which may be a personal computer, a server, a network device, or the like) to execute all or part of the steps of the method described in each embodiment of the present disclosure. The above-mentioned storage medium includes: USB flash disks, read-only memories (ROMs), random access memories (RAMs), mobile hard disks, magnetic disks, optical disks, or other media that may store program codes.

The above-described embodiments are merely example embodiments of the present disclosure. It should be noted that for person of ordinary skill in the art, several improvements and modifications may be made without departing from the principles of the present disclosure. These improvements and modifications should also be deemed as falling within the protection scope of the present disclosure.

The present disclosure may further be understood with clauses as follows.

Clause 1. A cluster management system, the system comprising:

an operation and maintenance control platform, configured to issue an operation request to a distributed consistency system in a cluster and display an operating state of the distributed consistency system; and a decider module, connected with the operation and maintenance control platform and configured to determine deciding information for processing the operation request and send the deciding information to the operation and maintenance control platform, wherein the deciding information is determined based on data consistency and availability of the distributed consistency system.

Clause 2. The system according to clause 1, wherein the system further comprises:

a monitoring module, located on a host in the cluster and configured to acquire monitoring data of a component module serving as a service role in the distributed consistency system, wherein the service role is a module for coordinating and processing user requests in each host of the cluster; and a monitoring platform, configured to collect the monitoring data acquired by the monitoring module, and display the monitoring data.

Clause 3. The system according to clause 2, wherein the monitoring platform is further configured to generate alarm information according to the monitoring data, and send the alarm information to a user-side device.

Clause 4. The system according to clause 1, wherein the decider module is further configured to determine an operation type corresponding to the operation request, and determine deciding information for executing an operation corresponding to the operation type, wherein the deciding information is determined based on an availability condition and a security condition of the distributed consistency system.

Clause 5. The system according to clause 4, wherein the decider module is further configured to determine to permit an execution of an operation corresponding to the operation request when the operation type is upgrading configuration information of the distributed consistency system.

Clause 6. The system according to clause 4, wherein the decider module is further configured to select a host from the cluster for upgrading when the operation type is upgrading services in the distributed consistency system, and before selecting the host from the cluster for upgrading, determine whether a service of a previous host before the host is upgraded meets the availability condition, and determine to upgrade the selected host when the service meets the availability condition.

Clause 7. The system according to clause 4, wherein the decider module is further configured to acquire a serial number of a newly added host when the operation type is replacing a host deployed by the distributed consistency system, and establish an association between the serial number of the newly added host and serial numbers of hosts not having been replaced in the distributed consistency system to form a new distributed consistency system.

Clause 8. The system according to clause 4, wherein the decider module is further configured to stop an external service of the distributed consistency system when the operation type is replacing a disk used by a designated host in the distributed consistency system, acquire log information and snapshot data from another host in the distributed consistency system, and resume the external service after storing the log information and the snapshot data to a newly added disk.

Clause 9. A cluster management method, the method comprising:

acquiring an operation request issued by a distributed consistency system in a cluster; and determining deciding information for processing the operation request, and sending the deciding information to an operation and maintenance control platform, wherein the deciding information is determined based on data consistency and availability of the distributed consistency system.

Clause 10. The method according to clause 9, wherein the determining deciding information for processing the operation request comprises:

determining an operation type corresponding to the operation request, and determining deciding information for executing an operation corresponding to the operation type, wherein the deciding information is determined based on an availability condition and a security condition of the distributed consistency system.

Clause 11. The method according to clause 10, wherein the determining the deciding information for executing the operation corresponding to the operation type comprises: in response to determining that the operation type is upgrading configuration information of the distributed consistency system, determining to permit an execution for an operation corresponding to the operation request.

Clause 12. The method according to clause 10, wherein the determining the deciding information for executing the operation corresponding to the operation type comprises:

selecting a host from the cluster for upgrading in response to determining that the operation type is upgrading services in the distributed consistency system;

before selecting the host from the cluster for upgrading, determining whether a service of a previous host before the host is upgraded meets the availability condition; and determining to upgrade the selected host in response to determining that the service meets the availability condition.

Clause 13. The method according to clause 10, wherein the determining the deciding information for executing the operation corresponding to the operation type comprises:

acquiring a serial number of a newly added host in response to determining that the operation type is replacing a host deployed by the distributed consistency system; and establishing an association between the serial number of the newly added host and serial numbers of hosts not having been replaced in the distributed consistency system to form a new distributed consistency system.

Clause 14. The method according to clause 10, wherein the determining the deciding information for executing the operation corresponding to the operation type comprises:

stopping an external service of the distributed consistency system in response to determining that the operation type is replacing a disk used by a designated host in the distributed consistency system;

acquiring log information and snapshot data from another host in the distributed consistency system; and resuming the external service after storing the log information and the snapshot data to a newly added disk.

Clause 15. A cluster management apparatus, the apparatus comprising:

an acquisition module, configured to acquire an operation request issued by a distributed consistency system in a cluster; and a processing module, configured to determine deciding information for processing the operation request, and send the deciding information to an operation and maintenance control platform, wherein the deciding information is determined based on data consistency and availability of the distributed consistency system.

Clause 16. A storage medium, wherein the storage medium comprises a program stored therein, wherein when running, the program controls a device on which the storage medium is located to execute the cluster management method in any one of clauses 9 to 14.

Clause 17. A computer system comprising:

a processor; and a memory, connected to the processor and configured to provide the processor with instructions for processing steps comprising:

acquiring an operation request issued by a distributed consistency system in a cluster; and determining deciding information for processing the operation request, and sending the deciding information to an operation and maintenance control platform, wherein the deciding information is determined based on data consistency and availability of the distributed consistency system

What is claimed is:

1. A method comprising:
    acquiring an operation request issued by a distributed consistency system in a cluster;
    determining deciding information for processing the operation request, the determining the deciding information for processing the operation request including:
        determining an operation type corresponding to the operation request; and
        determining the deciding information for executing an operation corresponding to the operation type, the determining the deciding information for executing the operation corresponding to the operation type including:
            before selecting a host from the cluster for upgrading, determining that a service of a previous host before the host is upgraded meets an availability condition;
            selecting the host from the cluster for upgrading in response to determining that the operation type is an upgrading service in the distributed consistency system; and
            determining to upgrade the selected host in response to determining that the service meets the availability condition; and
    sending the deciding information to an operation and maintenance control platform.

2. The method of claim 1, wherein the deciding information for processing the operation request is determined based on data consistency and availability of the distributed consistency system.

3. The method according to claim 1, wherein the deciding information for executing the operation corresponding to the operation type is determined based on the availability condition and a security condition of the distributed consistency system.

4. The method according to claim 1, further comprising:
    in response to determining that another operation type corresponding to another operation request is upgrading configuration information of the distributed consistency system, determining to permit an execution for an operation corresponding to the another operation request.

5. The method according to claim 1,
    further comprising:
    acquiring a serial number of a newly added host in response to determining that another operation type corresponding to another operation request is replacing a host deployed by the distributed consistency system; and
    establishing an association between the serial number of the newly added host and serial numbers of hosts not having been replaced in the distributed consistency system to form a new distributed consistency system.

6. The method according to claim 1, further comprising:
    stopping an external service of the distributed consistency system in response to determining that another operation type corresponding to another operation request is replacing a disk used by a designated host in the distributed consistency system;
    acquiring log information and snapshot data from another host in the distributed consistency system; and
    resuming the external service after storing the log information and the snapshot data to a newly added disk.

7. An apparatus comprising:
    one or more processors; and
    one or more computer readable media storing thereon computer-readable instructions that, when executed by the one or more processors, cause the one or more processors to perform acts comprising:
        acquiring an operation request issued by a distributed consistency system in a cluster;
        determining deciding information for processing the operation request, the determining the deciding information for processing the operation request including:
            determining an operation type corresponding to the operation request; and
            determining the deciding information for executing an operation corresponding to the operation type, the determining the deciding information for executing the operation corresponding to the operation type including:
                before selecting a host from the cluster for upgrading, determining that a service of a previous host before the host is upgraded meets an availability condition;
                selecting the host from the cluster for upgrading in response to determining that the operation type is an upgrading service in the distributed consistency system; and
                determining to upgrade the selected host in response to determining that the service meets the availability condition; and
        sending the deciding information to an operation and maintenance control platform.

8. The apparatus according to claim 7, wherein the deciding information is determined based on data consistency and availability of the distributed consistency system.

9. The apparatus according to claim 7, wherein the deciding information for executing the operation corresponding to the operation type is determined based on the availability condition and a security condition of the distributed consistency system.

10. The apparatus according to claim 7, wherein the acts further comprise:
    in response to determining that another operation type corresponding to another operation request is upgrading configuration information of the distributed consistency system, determining to permit an execution for an operation corresponding to the another operation request.

11. The apparatus according to claim 7, wherein the acts further comprise:
    acquiring a serial number of a newly added host in response to determining that another operation type corresponding to another operation request is replacing a host deployed by the distributed consistency system; and
    establishing an association between the serial number of the newly added host and serial numbers of hosts not having been replaced in the distributed consistency system to form a new distributed consistency system.

12. The apparatus according to claim 7, wherein the acts further comprise:
    stopping an external service of the distributed consistency system in response to determining that another operation type corresponding to another operation request is replacing a disk used by a designated host in the distributed consistency system;

acquiring log information and snapshot data from another host in the distributed consistency system; and resuming the external service after storing the log information and the snapshot data to a newly added disk.

13. One or more memories storing thereon computer-readable instructions that, when executed by one or more processors, cause the one or more processors to perform acts comprising:

issuing an operation request to a distributed consistency system in a cluster and display an operating state of the distributed consistency system; and determining deciding information for processing the operation request and sends the deciding information to an operation and maintenance control platform, wherein the deciding information for processing the operation request is determined based on data consistency and availability of the distributed consistency system, the determining the deciding information for processing the operation request including:

determining an operation type corresponding to the operation request; and determining the deciding information for executing an operation corresponding to the operation type, wherein the deciding information for executing the operation corresponding to the operation type is determined based on an availability condition and a security condition of the distributed consistency system, the determining the deciding information for executing the operation corresponding to the operation type including:

before selecting a host from the cluster for upgrading, determining that a service of a previous host before the host is upgraded meets the availability condition, selecting the host from the cluster for upgrading in response to determining that the operation type is an upgrading service in the distributed consistency system, and determining to upgrade the selected host in response to determining that the service meets the availability condition.

14. The one or more memories according to claim 13, wherein the acts further comprise:

acquiring monitoring data in a respective host of the cluster; and collecting the monitoring data.

15. The one or more memories according to claim 13, wherein the acts further comprise displaying the monitoring data.

16. The one or more memories according to claim 13, wherein the acts further comprise:

in response to determining that another operation type corresponding to another operation request is upgrading configuration information of the distributed consistency system, determining to permit an execution of an operation corresponding to the another operation request.

17. The one or more memories according to claim 13, wherein the acts further comprise:

acquiring a serial number of a newly added host in response to determining that another operation type corresponding to another operation request is replacing a host deployed by the distributed consistency system; and establishing an association between the serial number of the newly added host and serial numbers of hosts not having been replaced in the distributed consistency system to form a new distributed consistency system.

18. The one or more memories according to claim 13, wherein the acts further comprise:

stopping an external service of the distributed consistency system in response to determining that another operation type corresponding to another operation request is replacing a disk used by a designated host in the distributed consistency system;

acquiring log information and snapshot data from another host in the distributed consistency system; and resuming the external service after storing the log information and the snapshot data to a newly added disk.

19. The one or more memories according to claim 14, wherein the monitoring data relates to coordinating and processing user requests in the respective host of the cluster.

20. The one or more memories according to claim 14, wherein the acts further comprise:

generating alarm information according to the monitoring data; and sending the alarm information to a user-side device.

* * * * *